(12) United States Patent
Lee

(10) Patent No.: US 9,762,627 B2
(45) Date of Patent: Sep. 12, 2017

(54) METHOD OF SEARCHING FOR AND REGISTERING NETWORK DEVICE USING HTTP AND NETWORK REGISTRATION SERVICE APPARATUS

(71) Applicant: IDIS CO., LTD., Daejeon-si (KR)

(72) Inventor: Sang Hoon Lee, Seoul (KR)

(73) Assignee: IDIS CO., LTD., Daejeon-Si (KR)

( * ) Notice: Subject to any disclaimer, the term of this patent is extended or adjusted under 35 U.S.C. 154(b) by 189 days.

(21) Appl. No.: 14/788,934

(22) Filed: Jul. 1, 2015

(65) Prior Publication Data

US 2016/0359928 A1 Dec. 8, 2016

(30) Foreign Application Priority Data

Jun. 4, 2015 (KR) .................. 10-2015-0079089

(51) Int. Cl.
 *G06F 15/16* (2006.01)
 *H04L 29/06* (2006.01)
 (Continued)

(52) U.S. Cl.
 CPC ...... *H04L 65/1073* (2013.01); *H04L 12/2803* (2013.01); *H04L 12/2807* (2013.01);
 (Continued)

(58) Field of Classification Search
 CPC .... H04L 12/2803–12/282; H04L 41/12; H04L 67/1061–67/107;
 (Continued)

(56) References Cited

U.S. PATENT DOCUMENTS 6,308,205 B1 * 10/2001 Carcerano ........... H04L 41/0253
 709/220
2005/0243777 A1 * 11/2005 Fong ..................... H04L 12/66
 370/338
(Continued)

FOREIGN PATENT DOCUMENTS

JP 2010-507874 A 3/2010

OTHER PUBLICATIONS

Korean Office Action issued on Jun. 17, 2016 in counterpart Korean Application No. 10-2015-0079089 (6 pages in Korean).

*Primary Examiner* — Brendan Higa
(74) *Attorney, Agent, or Firm* — NSIP Law

(57) ABSTRACT

A method of searching for a network device and registering the network device to a network using HTTP and a network registration service apparatus are provided. The method includes receiving, at a registration server, registration information from the network device; receiving, at the registration server, a registration request message from the client message through a HTTP protocol; creating, at the registration server, a web page containing both a list of network devices that are accessing the same network as the client device and access information allowing for access to the network devices; transmitting, at the registration server, the web page to the client device through a HTTP protocol; and in response to receiving an access request message from the client device, transmitting, at the network device, an initial setting page to the client device, whereby the client device registers the network device to the network.

19 Claims, 5 Drawing Sheets

(51) Int. Cl.
*H04L 29/08* (2006.01)
*H04L 12/28* (2006.01)
*H04L 12/24* (2006.01)

(52) U.S. Cl.
CPC .......... *H04L 12/2809* (2013.01); *H04L 41/12* (2013.01); *H04L 63/101* (2013.01); *H04L 67/02* (2013.01); *H04L 67/34* (2013.01)

(58) Field of Classification Search
CPC .. H04L 65/1069–65/1073; H04L 67/02; H04L 67/34
See application file for complete search history.

(56) References Cited

U.S. PATENT DOCUMENTS

| | | | |
|---|---|---|---|
| 2007/0106764 A1* | 5/2007 | Mansfield | H04L 12/2803 709/220 |
| 2009/0066789 A1* | 3/2009 | Baum | G06F 17/30017 348/143 |
| 2010/0023350 A1 | 1/2010 | Simms | |
| 2010/0241254 A1* | 9/2010 | McKinley | G08C 17/02 700/90 |
| 2011/0154136 A1* | 6/2011 | Osuki | H04L 41/0253 714/57 |
| 2014/0006481 A1* | 1/2014 | Frey | H04L 41/0246 709/203 |
| 2015/0081888 A1* | 3/2015 | Pham | H04L 43/0811 709/224 |

* cited by examiner

METHOD OF SEARCHING FOR AND REGISTERING NETWORK DEVICE USING HTTP AND NETWORK REGISTRATION SERVICE APPARATUS

CROSS-REFERENCE TO RELATED APPLICATION(S)

This application claims priority from Korean Patent Application No. 10-2015-0079089, filed on Jun. 4, 2015, in the Korean Intellectual Property Office, the disclosure of which is incorporated herein by reference in its entirety.

BACKGROUND

1. Field

The following description relates to a computing technology, and more particularly, to a method of registering a network device using a hyper-text transfer protocol (HTTP) and a network registration service apparatus.

2. Description of the Related Art

To use network services provided through devices that support network connections, a user may need to purchase and install necessary network devices and register and set up the installed network devices. More specifically, the user needs to know a name that is registered on an IP address or DDNS of each installed network device in order to register and set up the network device on a network.

However, it is not easy to get an IP address or device name of a network device, such as an IP camera, which does not usually have an output screen. Thus, to overcome such a difficulty, a method of searching for a network device using a protocol, such as multicast Domain Name System (m DNS), Web Services Dynamic Discovery (WS-Discovery), and Simple Service Discovery Protocol (SSDP), has been introduced. This method is, however, problematic in that specific programs that support the relevant protocols and are dependent upon particular platforms should be used.

SUMMARY

The following description relates to a method of registering a network device to a network without using a specific program dependent on a particular platform.

In one general aspect, there is provided A method of registering a network device to a specific network using hyper-text transfer protocol (HTTP), the method including: receiving, at a registration server, registration information from the network device, the registration information comprising identification information of the network device; receiving, at the registration server, a registration request message from the client message through a HTTP protocol; creating, at the registration server, a web page that contains both a list of network devices that are accessing the same network as the client device and access information that allows for access to the network devices of the list; transmitting, at the registration server, the web page to the client device through a HTTP protocol; and in response to receiving an access request message from the client device, transmitting, at the network device, an initial setting page to the client device, thereby enabling the client device to register the network device to the network. The registration server may receive from the network device the registration information that further comprises access information that was created differently each time the network device accessed the network. At this time, the registration server may receive from the network device the registration information that further comprises an access port for an access URL that was created differently each time the network device accessed the network.

The registration server may receive from the network device the registration information that further comprises snapshot information of the network device. The snapshot information may be either video image information or still image information. The snapshot information may be access information that allows for access to video image information or still image information.

The registration server may receive from the network device the registration information that further comprises an initial setting page with specific expiration period information applied thereto. The registration server may create the web page that contains both a list of network devices that are accessing the same network as the client device and whose initial setting pages have a valid expiration period and access information that allows for access to the network devices of the list.

The method may further include, in response to receiving a registration completion message from the network device, removing, at the registration server, the registration information of the network device from the list of network devices.

Other features and aspects will be apparent from the following detailed description, the drawings, and the claims.

Figure 1:
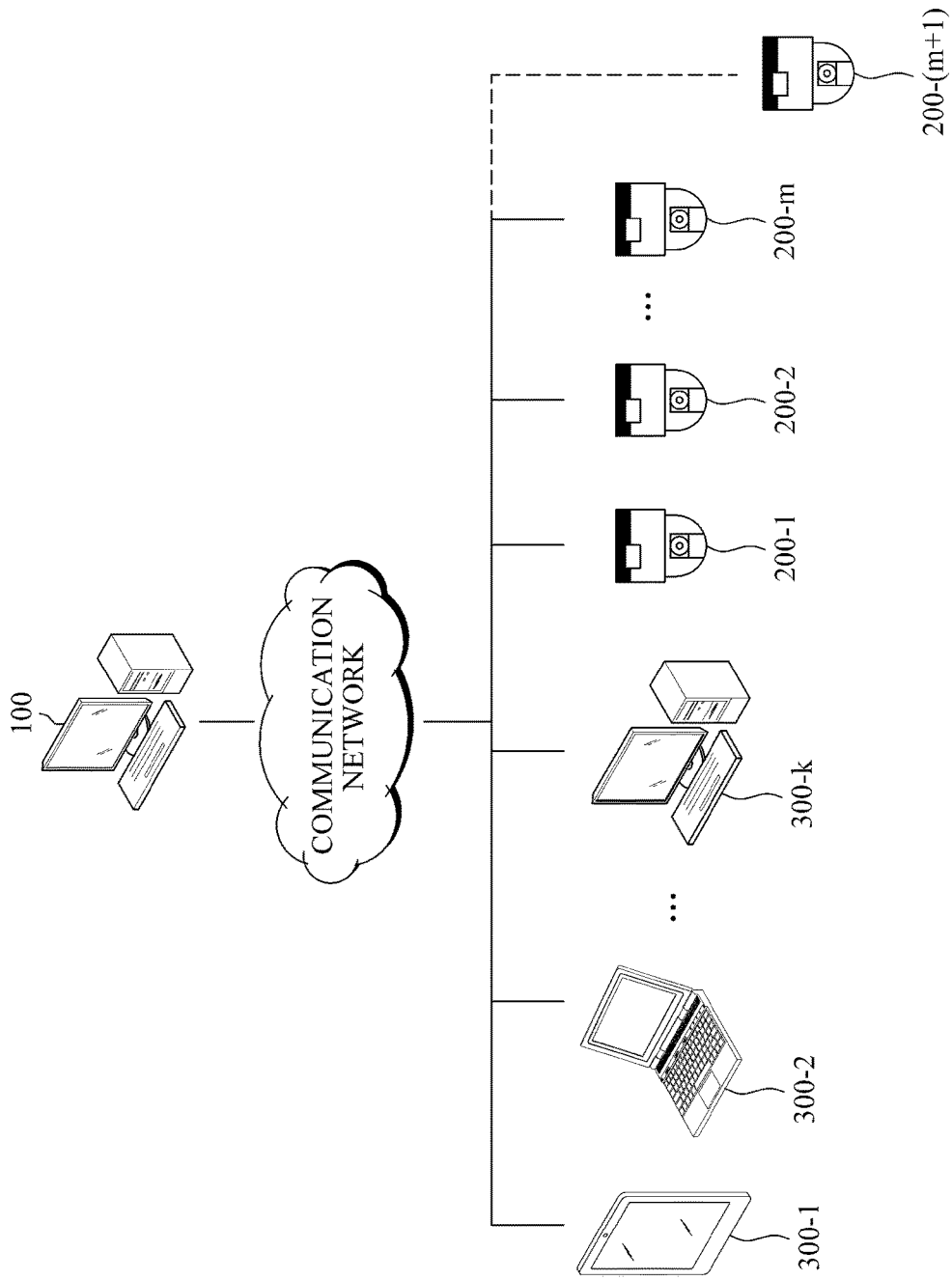
FIG. 1 is a diagram illustrating an overall configuration of a network device registration system using a hyper-text transfer protocol (HTTP) according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an overall configuration of a network device registration system using a hyper-text transfer protocol (HTTP) according to an exemplary embodiment of the present invention.

Referring to FIG. 1, the network device registration system using HTTP includes a registration server 100, network devices 200-1, 200-2, . . . , and 200-m, and client devices 300-1, 300-2, . . . , and 300-k.

The registration server 100 manages registration information of each network device 200-1, 200-2, . . . , and 200-m to allow the network device to communicate with client devices 300-1, 300-2, . . . , and 300-k. The registration server 100 is connected with a plurality of network devices 200-1, 200-2, . . . , and 200-m over a wired or wireless network. In addition, the registration server 100 is connected with the client device 300-1, 300-2, . . . , and 300-k over the wired or wireless network. For example, the wireless network may be a mobile communication network or a wireless Internet network (WiFi). Here, the registration server 100 may include information database for storing information necessary for system operation and a middleware for connecting and relaying external devices and the database.

Once the network devices 200-1, 200-2, . . . , and 200-m access the network, the registration server 100 registers the network devices, and then after the registration, the network devices perform their unique functions. The network devices 200-1, 200-2, . . . , and 200-m may be connected as new devices to the network. For example, a network device 200-(m+1) may be connected as a new device to the network of the system shown in FIG. 1. In this example, the network to which the network device 200-(m+1) is connected may be an existing network, but aspects of the present disclosure are not limited thereto, such that the new network device 200-(m+1) may be connected to a newly built network.

In one exemplary embodiment, the network devices 200-1, 200-2, . . . , and 200-m may be IP cameras or network cameras. When an IP camera accesses the network, unique identification information of the IP camera is registered to the network by the registration server 100, and after the registration, the IP camera monitors a designated area. Generally, the IP camera comprises a camera connected to a wired/wireless Internet, a camera module, a decoder, an image compression chip, a central processing unit (CPU), and a network transmission chip. That is, the IP camera has a web server, a storage device, and an intelligent image processing and event processing device, and by using these elements, the IP camera is able to perform various functions, such as real-time monitoring of images, event tracking and the like.

The client devices 300-1, 300-2, . . . , and 300-k act as media for registration of the network devices 200-1, 200-2, . . . , and 200-m with the registration server 100. The client devices 300-1, 300-2, . . . , and 300-k that are connected to the network using a wired or wireless network connection communicate with the registration server 100 or the network devices 200-1, 200-2, . . . , and 200-m. In one exemplary embodiment, the client devices 300-1, 300-2, . . . , and 300-k are computing devices that have an output screen. For example, the client devices 300-1, 300-2, . . . , and 300-k may be any types of personal portable devices with various features, such as, personal mobile communication service terminals, personal digital assistants (PDAs), smartphones, table computers, laptop computers, and wireless LAN terminal devices.

Figure 2:
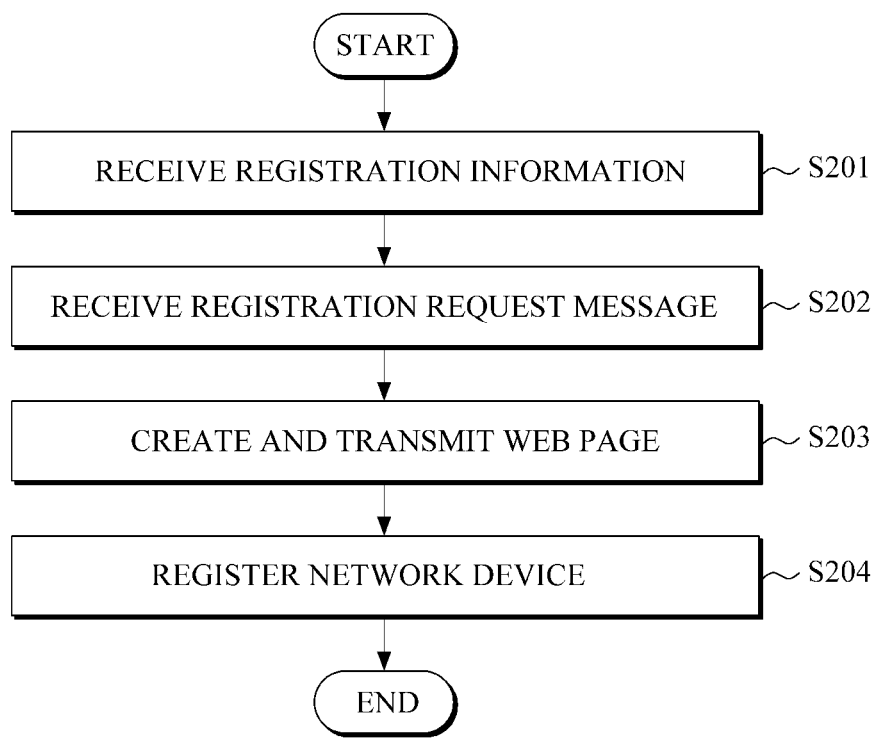
FIG. 2 is a flowchart illustrating a method of registering network devices using HTTP according to an exemplary embodiment.

FIG. 2 is a flowchart schematically illustrating a method of registering network devices using HTTP according to an exemplary embodiment.

Referring to FIG. 2, the method of registering a network device may primarily include the following operations of: receiving registration information as depicted in S201; receiving a registration request message as depicted in S202; creating and transmitting a web page as depicted in S203; and registering a network device with a network as depicted in S204. The network device may inform the registration server that the network device has accessed the network, and it may use a client device to be registered to the network. For example, in the case of such network devices as IP cameras that do not have an output screen, it is not easy for users to identify their IP addresses or device names, and thus the client device is used to register the network device to the network.

In S201, the registration server is informed that the network device has accessed the network. In S202, the registration server receives a registration request message from the network device, whereby the registration server can recognize that operations for registration of the network device need to be performed.

In S203, the registration server creates information on the network device in the form of web page, and transmits the web page to the client device.

In S204, the client device accesses the network device using the web page, and registers the network device to the network. That is, the client device performs substantial operations for registering the network device to the network.

Figure 3:
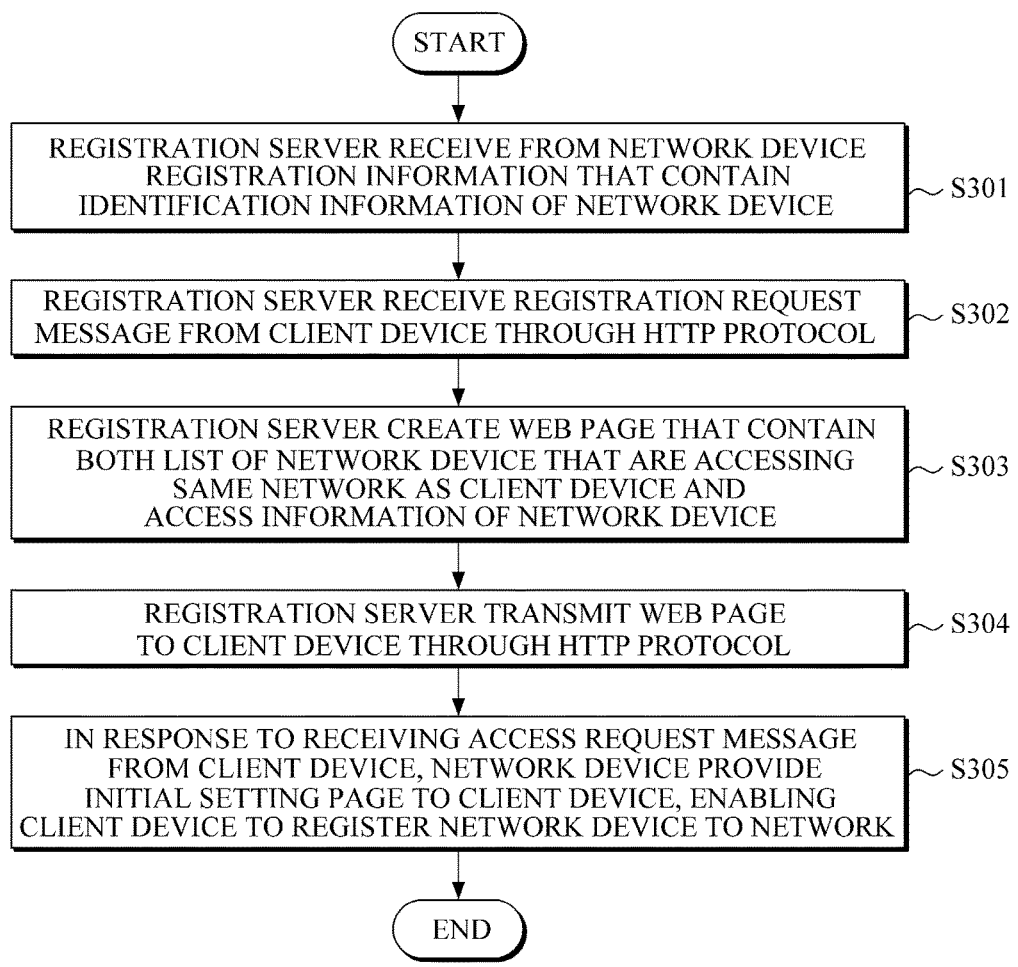
FIG. 3 is a flowchart illustrating in detail the method of registering a network device using HTTP which is shown in FIG. 2.

FIG. 3 is a flowchart illustrating in detail the method of registering a network device using HTTP which is shown in FIG. 2.

Referring to FIG. 3, the method of registering a network device using HTTP may primarily include the following operations of: a registration server receiving registration information from the network device as depicted in S301, the registration information containing identification information of the network device; the registration server receiving a registration request message from the client device through a HTTP protocol as depicted in S302; the registration server creating a web page that contains both a list of network devices that are accessing the same network as the client device and access information that allows access to the network devices as depicted in S303; and the registration server transmitting the created web page to the client device through a HTTP protocol as depicted in S304; and in response to receiving an access request message from the client device, the network device providing an initial setting page to the client device, allowing the network device to be registered to the network in S305. Procedures including the aforementioned exemplary embodiments described herein may be implemented in various forms.

First, the registration server receives registration information from the network device, the registration information containing identification information of the network device in S301. When accessing a particular network, the network device transmits its registration information to the registration server. In one exemplary embodiment, the network device may transmit the registration information to the registration server immediately upon accessing the particular network. In another exemplary embodiment, after accessing the particular network, the network device may transmit the registration information to the registration server in response to a specific command. For example, the network device may transmit the registration information to the registration server in response to a command that is created by pressing a button on the network device.

The "registration information" refers to information that is needed for the network device having unique identification information to be registered as an element to the network. For example, the registration information may include the identification information of the network device, access information to the network device, and an initial setting page appearing upon accessing the network device. However, the registration information is not limited thereto and may include any information that is needed for registering the network device to the network.

In one aspect, in S301, the registration server may receive, from the network device, registration information that further includes access information that was generated differently each time the network device accessed the network. For example, the network device may generate different access information each time accessing the network in order to strengthen the security of the network device. The access information generated differently may be contained in the registration information and sent to the registration server. In this case, a client device with the previous access information to the network device is not able to access said network device any longer, and only a client device that uses newly generated access information is allowed to access said network device.

In one exemplary embodiment, in S301, the registration server may receive, from the network device, the registration information that further include an access port for an access URL that was created differently each time the network device accessed the network.

In another aspect, in S301, the registration server may receive the registration information that further includes snapshot information of the network device. In a case where many network devices are connected to the same network, it may be difficult to distinguish all connected network devices from one another by their identification information or access information. In this case, for the network devices that are related to image processing (e.g., IP cameras), registration information may include snapshot information of the network devices and sent to the registration server, so that said network devices can be distinguished from one another by using the snapshot information.

The snapshot information may be video image information or still image information. For example, the snapshot information may be video image information which is video images played for a given period of time. Alternatively, the snapshot information may be still image information which is an image captured at a given time.

In addition, the snapshot information may be access information that allows for access to video image information or still image information. For example, the snapshot information may be an access address at which a video that is played for a given period of time can be viewed. Alternatively, the snapshot information may be an access address at which an image captured at a given time can be viewed.

In another aspect, in S301, the registration server may receive, from the network device, registration information that further includes an initial setting page with specific expiration period information applied thereto. Here, the initial setting page refers to a page on which settings are made for registration of the network device to the network. An address for access to the initial setting page may be formed as URL.

In one exemplary embodiment, the initial setting page may be set differently for each network device. In another exemplary embodiment, the initial setting page may be set differently for even the same network device according to specific criteria. For example, expiration period information may be applied to an initial setting page of one network device, and when the expiration has elapsed, the initial setting page may be determined as invalid. In this case, a client device that attempts to access the expired initial setting page is not allowed to access said network device, and only a client device that attempts to access a non-expired initial setting page can successfully access the network device.

Thereafter, in S302, the registration server receives the registration request message from the client device through a HTTP protocol.

The client device is used to register the network device to the network. The client device is a computing device that has an output screen, and it has accessed the same network as the network device. In one exemplary embodiment, the registration server receives the registration request message from the client server that requests the registration of the network device to the network. For example, the client device may access a URL of the registration server by using a web browser (e.g., Internet Explorer, Mozilla Firefox, Opera, Safari, Google Chrome, etc.) and transmit the registration request message.

In one exemplary embodiment, the client device may transmit the registration request message immediately upon accessing the registration server. In another exemplary embodiment, after accessing the registration server, the client device may transmit the registration request message. For example, the client device may transmit the registration request message to the registration server in response to an action made by clicking a registration request button image displayed on a screen provided by the registration server. Then, the registration server receives the registration request message sent from the client device.

Then, in 303, the registration server creates a web page that contains both a list of network devices that are accessing the same network as the client device and access information that allows access to the network devices of the list.

The registration server confirms a network address of the client device that has sent the registration request message, searching for a network device that is accessing the confirmed network address, and then creates a web page for the network device that is accessing the same network as the client device. This is because the client device is able to access only the network device that is accessing the same network as the client device.

In one exemplary embodiment, two or more network devices may be accessing the same network as the client device. The registration server may create a web page for all network devices that are accessing the same network as the client device. In this case, the registration server may create a web page that presents information of the network devices in a list form. For example, the web page created by the registration server may contain both a list of all accessing network devices and access information that allows access to each of the accessing network device. In another example, the registration server may use a HTML tag hyperlink to represent access information to each network device using

TABLE 1

<a href="http://192.168.100.2/initial_1">ND_A</a><br>
<a href="http://192.168.100.3/initial_2">ND_B</a><br>
<a href="http://192.168.100.3/initial_m">ND_C</a><br>
<a href="http://192.168.100.3/initial_m+1">ND_D</a><br>

Here, the client device is accessing a network "http://192.168.100.3", and the registration server searches for network devices ND_A, ND_B, ND_S, and ND_D which are accessing the same network as the client device. The network devices ND_A, ND_B, ND_S, and ND_D are all accessing the network "http://192.168.100.3".

"initial_1", "initial_2", "initial_m", "initial_m+1" may represent local directory information or port information that is needed for access to the respective network devices ND_A, ND_B, ND_S, and ND_D. For example, the local directory information may refer to an initial setting page to be connected to upon accessing a corresponding network device.

In one aspect, in S303, the registration server may create a web page that contains both a list of network devices that are accessing the same network as the client device and whose initial setting pages have a valid expiration period and access information that allows for access to the network devices of the list.

In the above case, if an initial setting page of network device ND_B is expired, the registration server may create a web page by removing the network device ND_B from the list of network devices. That is, the registration server may create a web page that contains access information that allows access to network devices ND_A, ND_S, and ND_D.

In 304, the registration server transmits the created web page to the client device through a HTTP protocol. In one exemplary embodiment, the client device receives the web page from the registration server and checks the list of network devices that are accessing the same network as the client device. In another exemplary embodiment, the client device receives, form the registration server, a web page that contains a list of network devices whose initial setting pages are not expired, and then the client device checks the list of network devices that are accessing the same network as the client device.

Then, in S305, in response to receiving an access request message from the client device, the network device provides the initial setting page to the client device, thereby enabling the client device to register the network device to the network.

The client device may access a specific network device through a hyperlink contained in the web page. The client device may access an initial setting page of the network device through an address defined in the hyperlink.

Here, the initial setting page refers to a page on which settings are made for registration of the network device to the network. In one exemplary embodiment, the initial setting page may be configured differently for each network device. In another exemplary embodiment, the initial setting page may be configured differently for each group of network devices. For example, initial setting pages of IP cameras may be configured to be of the same type as each other. In other example, the initial setting page may be configured differently according to manufacturers of the network devices.

The client device may access the initial setting page of the network device and set registration information for the network device. For example, the client device may change an IP address of the network device on the initial setting page. In another example, the client device may register the network device to dynamic DNS (DDNS) on the initial setting page. In another example, the client device may register a user password on the initial setting page of the network device.

Figure 4:
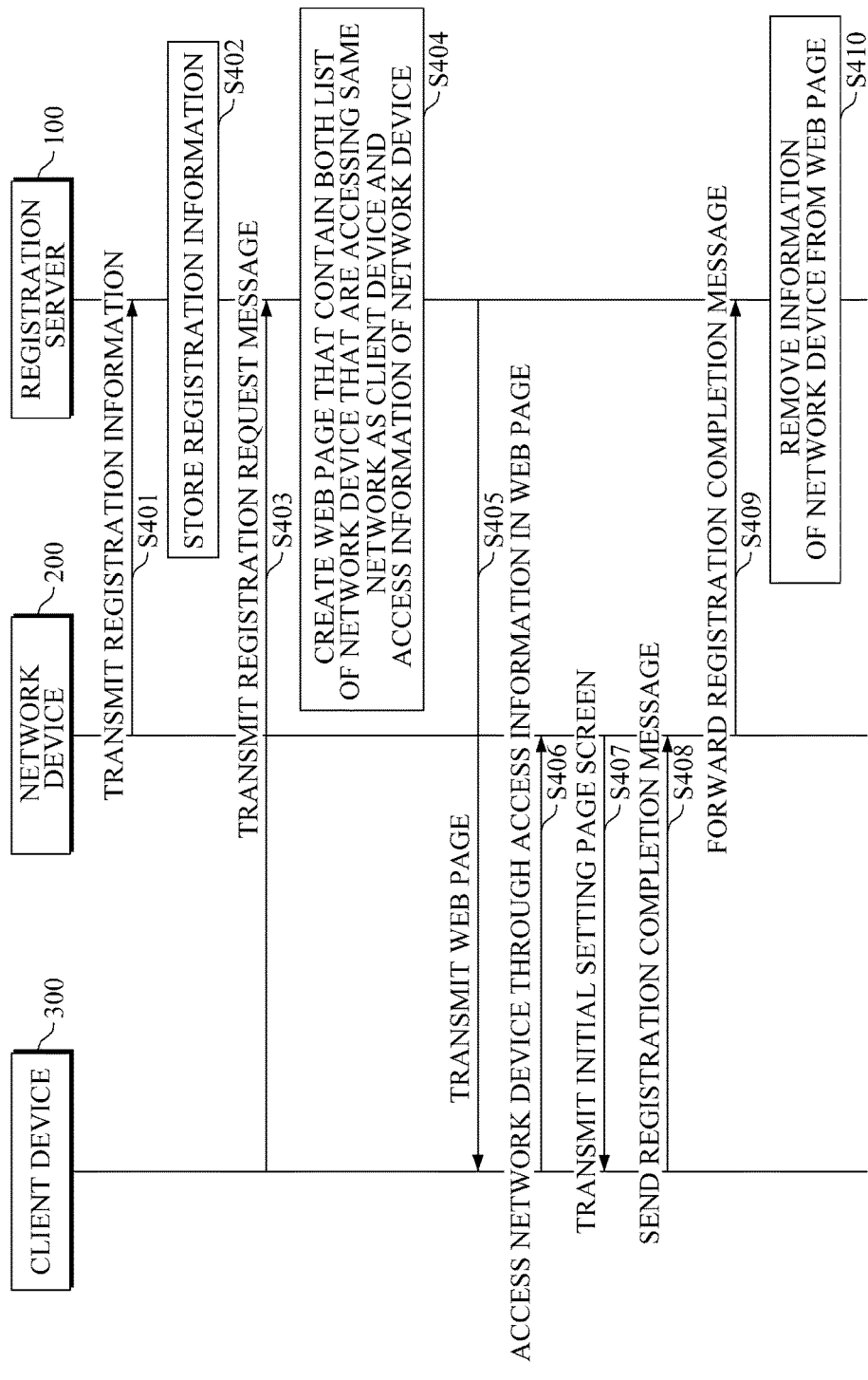
FIG. 4 is a flowchart illustrating a method for registering a network device using HTTP according to another exemplary embodiment of the present invention.

FIG. 4 is a flowchart illustrating a method for registering a network device using HTTP according to another exemplary embodiment of the present invention.

Referring to FIG. 4, the method of registering a network device using HTTP further includes, in addition to the operations of the method shown in FIG. 3, an operation of the registration server removing from a list of network device the registration information of the network device that has sent a registration completion message. To avoid redundancy, the method of FIG. 4 will be briefly described, and the operations described with reference to FIGS. 1 to 3 may apply to the method of FIG. 4. Procedures described hereinafter may be implemented in various forms.

In S401, a network device 200 transmits registration information to a registration server 100. In S402, the registration server 100 stores the registration information. The registration server may store the registration information in either a transient storage medium or a non-transient storage medium.

In S403, a client device 300 transmits a registration request message to the registration server 100.

In S404, the registration server 100 creates a web page that contains both a list of network devices that are accessing the same network as the client device and access information that allows for access to the network devices of the list. Then, the registration server 100 transmits the web page, as depicted in S405.

When the client device 300 accesses the network device 200 through access information of the web page, as depicted in S406, the network device 200 transmits an initial setting page screen to the client device 300, as depicted in S407. The client device 300 is allowed to register the network device to the network by accessing the initial setting page of the network device.

When the client device 300 sends a registration completion message to the network device 200 as depicted in S408, the network device 200 forwards the registration completion message to the registration server as depicted in S409.

Then, in S410, the registration server 100 removes information of the network device from the web page. In one exemplary embodiment, in response to the registration completion message from the network device, the registration server may remove the registration information of said network device from the list of network devices that has been previously generated.

Figure 5:
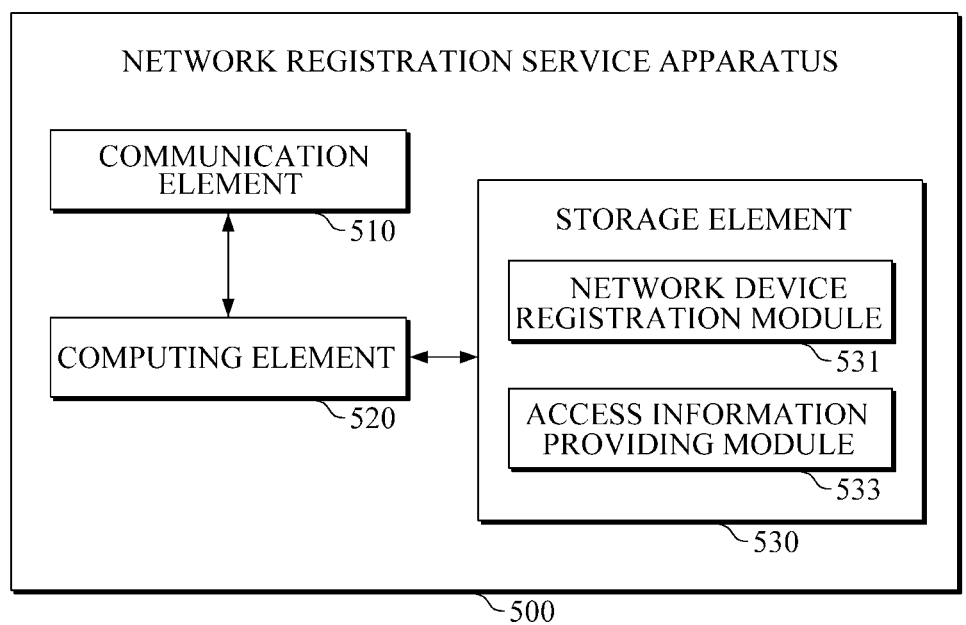
FIG. 5 is a block diagram illustrating a configuration of a network registration service apparatus according to an exemplary embodiment of the present invention.

FIG. 5 is a block diagram illustrating a configuration of a network registration service apparatus according to an exemplary embodiment of the present invention.

Referring to FIG. 5, the network registration service apparatus 500 includes a communication element 510, a computing element 520, and a storage element 530. The storage element 530 stores one or more computer programs, and the network registration service apparatus 500 executes the computer programs stored in the storage element 530.

The configuration of the network registration service apparatus 500 illustrated in FIG. 5 is exemplary, and the network registration service apparatus 500 may include only some of the aforementioned modules and/or include additional modules necessary for specific operations. For example, the network registration service apparatus 500 may further include a manipulation element that enables a user to directly input a user instruction.

In one exemplary embodiment, the network registration service apparatus 500 may be implemented on a registration server. In another exemplary embodiment, the network registration service apparatus 500 may be implemented on a separate server.

The communication element 510 enables communication with other devices through one or more external ports.

The computing element 510 controls the overall network registration service apparatus 500. For example, the computing element 520 performs various functions of the network registration service apparatus 500 and processes data by executing software programs and/or instructions which are stored in the storage element 530.

The storage element 530 is a non-transient memory and stores one or more computer programs. The storage element 530 may be flash memory or small, non-volatile memory. For example, the storage element 530 may be flash memory with low power consumption that can retain the data even when the power is shut off. However, aspects of the present disclosure are not limited thereto, such that any appropriate known semiconductor memory can be used as the storage element 530.

The storage element 530 stores one or more computer programs. The computer program may be a group of applications or instructions. The storage element 530 includes a network device registration module 531 and access information providing module 533.

Although the network device registration module 531 and the access information providing module 533 are described as being independent of each other in the present exemplary embodiment, they may be implemented as a single form, a single physical device or a single module. For example, the network device registration module 351 and the access information providing module 533 may be implemented in such a way that they are executed as separate processes on a single or a number of servers, or that each module is executed as a plurality of processes. Furthermore, the network device registration module 531 and the access information providing module 533 may be implemented to be executed as a single process. In addition, each of the network registration module 531 and the access information providing module 533 may be implemented as a single physical device, a number of physical devices that are not grouped, or a group of physical devices.

The network device registration module 531 may receive registration information from the network device through the communication element, and then stores in the storage element the received registration information that contains identification information of the network device.

In one aspect, the network device registration module 531 may receive registration information from the network device through the communication element, and store the registration information in the storage element, wherein the registration information further includes access information that was generated differently each time the network device accessed the network. At this time, the network device registration module 531 may receive registration information from the network device through the communication element and store the information in the storage element, wherein the registration information further contains an access port for an access URL that was created differently each time the network device accessed the network.

In another aspect, the network device registration module 531 may receive registration information that further contains snapshot information of the network device, and then the network device registration module 531 may store the information in the storage element. The snapshot information may be video image information or still image information. For example, the snapshot information may be video image information which is video images played for a given period of time. Alternatively, the snapshot information may be still image information which is an image captured at a given time. In addition, the snapshot information may be access information that allows for access to video image information or still image information. For example, the snapshot information may be an access address at which a video that is played for a given period of time can be viewed. Alternatively, the snapshot information may be an access address at which an image captured at a given time can be viewed.

In another aspect, the network device registration module 531 may receive registration information from the network device and store the information in the storage element, wherein the registration information contains an initial setting page with specific expiration period information applied thereto.

When the communication element receives a registration request message from the client device through a HTTP protocol, the access information providing module 533 extracts from the storage element both the network device that is accessing the same network as the client device and the access information that allows for access to said network device. Then the access information providing module 533 creates a web page that contains all the extracted information and provides the web page to the client device that has sent the registration request message.

In one aspect, the access information providing module 533 may create a web page that contains both a list of network devices that are accessing the same network as the client device and whose initial setting pages have a valid expiration period and access information that allows for access to the network devices of the list, and then the access information providing module 533 provides the web page to the client device that has sent the request message.

In one aspect, the network registration service apparatus 500 may further include a processing module for registration completion. In response to receiving a registration completion message from the network device through the communication element, the processing module for registration completion removes both the network device and access information that allows for access to said network device from the list of network devices.

According to the exemplary embodiments described above, a network device that accesses the same network as a client device can be registered to the network through an existing browser by using HTTP protocol.

The method of registering a network device using HTTP protocol described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more softwares in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of searching for a network device and registering the network device to a specific network using a hyper-text transfer protocol (HTTP), the method comprising:
   receiving, at a registration server, registration information from the network device, wherein the registration information comprises identification information of the network device;
   receiving, at the registration server, a registration request message from a client device through the HTTP protocol;
   creating, at the registration server, a web page that contains both a list of network devices that are accessing the same network as the client device and access information that allows for access to the network devices of the list;
   transmitting, at the registration server, the web page to the client device through the HTTP protocol; and
   in response to receiving an access request message from the client device, transmitting, at the network device, an initial setting page to the client device, thereby enabling the client device to register the network device to the network.

2. The method of claim 1, wherein the registration server is further configured to receive from the network device the registration information, wherein the registration information further comprises access information that was created differently each time the network device accessed the network.

3. The method of claim 2, wherein the registration server is further configured to receive from the network device the registration information, wherein the registration information further comprises an access port for an access URL that was created differently each time the network device accessed the network.

4. The method of claim 1, wherein the registration server is further configured to receive from the network device the registration information, wherein the registration information further comprises snapshot information of the network device.

5. The method of claim 4, wherein the snapshot information comprises either one of video image information and still image information.

6. The method of claim 4, wherein the snapshot information comprises access information that allows for access to either one of video image information and still image information.

7. The method of claim 1, wherein the registration server is further configured to receive from the network device the registration information, wherein the registration information further comprises an initial setting page with specific expiration period information applied to the initial setting page.

8. The method of claim 7, wherein the registration server is further configured to create the web page that contains both a list of network devices that are accessing the same network as the client device and whose initial setting pages comprise a valid expiration period and access information that allows for access to the network devices of the list.

9. The method of claim 1, further comprising:
   in response to receiving a registration completion message from the network device, removing, at the registration server, the registration information of the network device from the list of network devices.

10. A non-transitory computer-readable medium storing instructions that, when executed by a processor, cause the processor to perform the method of claim 1.

11. A network registration service apparatus, comprising:
    a non-transitory storage element storing program codes; and
    a processor configured to execute the program codes stored in the non-transitory storage element,
    wherein the program codes comprise:
       a network device registration module configured to receive registration information from a network device through a communication element, and store the registration information in the non-transitory storage element, wherein the registration information comprises identification information of the network device; and
       an access information providing module configured to: in response to the communication element receiving a registration request message from a client device through an HTTP protocol, extract from the non-transitory storage element both a network device that is accessing the same network as the client network and access information that allows for access to the network device; create a web page that contains all the extracted information; and transmit the web page to the client device, which has sent the registration request message.

12. The network registration service apparatus of claim 11, wherein the network device registration module is further configured to receive from the network device the registration information, and store the registration information in the non-transitory storage element after the registration information has been received from the network device, wherein the registration information further comprises access information that was created differently each time the network device accessed the network.

13. The network registration service apparatus of claim 12, wherein the network device registration module is further configured to receive from the network device the registration information, and store the registration information in the non-transitory storage element after the registration information has been received, wherein the registration information further comprises an access port for an access URL that was created differently each time the network device accessed the network.

14. The network registration service apparatus of claim 11, wherein the network device registration module is further configured to receive the registration information, and store the registration information in the non-transitory storage element, wherein the registration information further comprises snapshot information of the network device.

15. The network registration service apparatus of claim 14, wherein the snapshot information comprises either one of video image information and still image information.

16. The network registration service apparatus of claim 14, wherein the snapshot information comprises access information that allows for access to either one of video image information and still image information.

17. The network registration service apparatus of claim 11, wherein the network device registration module is further configured to receive from the network device the registration information that further comprises an initial setting page with specific expiration period information applied to the initial setting page, and store the received registration information in the non-transitory storage element after the registration information has been received.

18. The network registration service apparatus of claim 17, wherein the access information providing module is further configured to create the web page that contains both a list of network devices that are accessing the same network as the client device and whose initial setting pages comprise a valid expiration period and access information that allows for access to the network devices of the list.

19. The network registration service apparatus of claim 11, wherein the program codes further comprise:
    a processing module for registration completion configured to, in response to receiving a registration completion message from the network device, remove the registration information of the network device from the list of network devices.

\* \* \* \* \*